United States Patent
Ruiz et al.

(10) Patent No.: US 10,356,175 B2
(45) Date of Patent: Jul. 16, 2019

(54) REQUEST MULTIPLEXING (71) Applicant: Verizon Digital Media Services Inc., Dulles, VA (US)

(72) Inventors: Sergio Leonardo Ruiz, Redondo Beach, CA (US); Derek Shiell, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 278 days.

(21) Appl. No.: 15/237,969

(22) Filed: Aug. 16, 2016

(65) Prior Publication Data
US 2018/0054482 A1 Feb. 22, 2018

(51) Int. Cl.
*G06F 15/16* (2006.01)
*H04L 29/08* (2006.01)

(52) U.S. Cl.
CPC ...... *H04L 67/1097* (2013.01); *H04L 67/1004* (2013.01); *H04L 67/2852* (2013.01)

(58) Field of Classification Search
CPC .................. H04L 67/1097; H04L 67/1004
See application file for complete search history.

(56) References Cited

U.S. PATENT DOCUMENTS

2004/0044731 A1* 3/2004 Chen ................ H04L 67/02
709/203

\* cited by examiner

*Primary Examiner* — Hua Fan
(74) *Attorney, Agent, or Firm* — Ansari Katiraei LLP; Arman Katiraei; Sadiq Ansari (57) ABSTRACT

The embodiments provide request multiplexing whereby a server receiving a first request for content clones and issues the cloned request to an origin to initiate retrieval of the content. The first request and subsequent requests for the same content are placed in a queue. The server empties a receive buffer that is populated with packets of the requested content as the packets arrive from the origin by writing the packets directly to local storage without directly distributing packets from the receive buffer to any user. The rate at which the server empties the receive buffer is therefore independent of the rate at which any user receives the packets. A first set of packets written to local storage can then be simultaneously distributed to one or more queued requests as the server continues emptying the receive buffer and writing a second set of packets to local storage.

20 Claims, 7 Drawing Sheets

REQUEST MULTIPLEXING

BACKGROUND ART

A caching server or a proxy server distributes content on behalf of different content providers to different end users. The caching server receives an initial request for particular content provider content from an end user. This initial request will typically result in a cache miss as the caching server will not have a locally cached copy of the requested content. Accordingly, the caching server retrieves a copy of the requested content from the particular content provider's origin server, wherein the origin server is the originating distribution point for content of the particular content provider. The caching server caches the retrieved copy in local memory or storage and distributes the retrieved content in response to the initial request. The caching server also distributes the locally cached copy of the content in response to subsequent end user requests for the same content. Thus, once a copy of content provider content is cached at the caching server, the caching server can serve that same copy to different end users without a subsequent access to the content provider origin server. A time-to-live parameter or other validation techniques can be used to determine when the caching server is to refresh the copy of the cached content from the origin server.

One or more caching servers can shield and reduce the load on an origin server by absorbing large numbers of end user requests and by fanning out cached copies of the origin server content in response to those requests. In other words, the caching servers expose the origin server to a mere fraction of the end user requests, which in turn substantially reduces load on the origin server.

Yet, there are certain circumstances in which the caching servers can impose onerous loads on the origin server. Such circumstances arise during an initial flood of requests for newly available content or newly updated content. For instance, when a popular download or streaming event (e.g., movie, episode from a show, sporting event, concert, or other live event) becomes available, a large number of users contemporaneously submit hundreds or thousands of requests for the same content to the same caching server.

In such circumstances, the caching server receives a first request for content that triggers the caching server to retrieve the content from an origin server. In the time it takes the caching server to request and retrieve the content from the origin server, the caching server may receive hundreds more requests for the same content. This is especially problematic when the content being retrieved is of a large size (e.g., several hundred megabytes or gigabytes). Since the caching server does not have the requested content cached at the time the subsequent requests arrive, and the caching server has no knowledge for when the content might be cached, each subsequent request results in a cache miss with the caching server forwarding additional requests for the same content to the origin server. The origin server will then send multiple copies of the same content to the same caching server in response to each of the requests. The initial flood of requests can effectively remove the request absorbing shield provided by the caching servers. Consequently, the origin server can quickly be overrun by the requests from the caching servers and become unresponsive as a result. An unresponsive origin server would cause the requested content to be unavailable to the caching servers and the end users.

Accordingly, there is a need to preserve the request shield provided by the caching servers for an origin server during an initial flood of content requests. There is a need to eliminate a caching server from submitting duplicative requests for the same content to the origin server even when the requests originate from different end users and the multiple requests for the same content arrive before the caching server retrieves a cached copy of the requested content. There is therefore a need to modify the cache miss operation of a caching server and prevent the caching server from issuing duplicative requests to an origin server when a cache fill operation for the same content is already in progress.

BRIEF DESCRIPTION OF THE DRAWINGS

A preferred embodiment of methods and systems for request multiplexing will now be described, by way of example only, with reference to the accompanying drawings in which.

DETAILED DESCRIPTION

The embodiments provide request multiplexing. The request multiplexing involves detecting requests directed to the same content during a cache fill or content retrieval operation and multiplexing the requests so that the requested content is retrieved and distributed to all requests with a single access to an origin source.

The request multiplexing is performed by and implemented on a first tier server that retrieves and distributes content from a second tier server. The first tier server can be a caching server or a proxy server. The second tier server can be an origin server originating different content for distribution by the first tier server. The first and second tier servers can be under control of different entities. For instance, a content delivery network (CDN) may operate the first tier server independent of the second tier server operated by a content provider. The first and second tier servers could also be under control of a common entity such as when the CDN implements its own caching hierarchy in which the first tier server cache fills from the second tier cache with the second tier cache having access to different content provider origins.

Several request multiplexing embodiments are presented below. The description commences with a basic request multiplexing embodiment and continues with various enhancements and optimizations for improving the request multiplexing performance in accordance with some embodiments.

Figure 1:
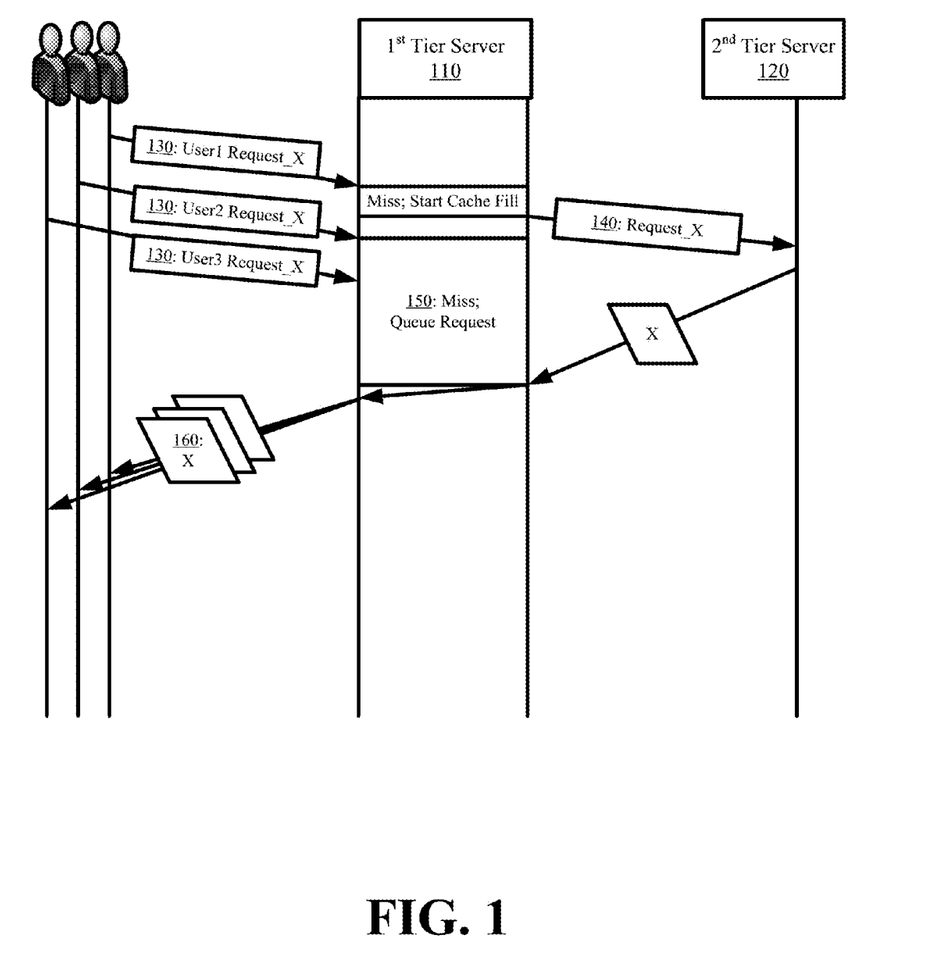
FIG. 1 conceptually illustrates basic request multiplexing in accordance with some embodiments.

FIG. 1 conceptually illustrates basic request multiplexing in accordance with some embodiments. The figure illustrates a first tier server 110 and a second tier server 120. The figure illustrates the first tier server 110 establishing multiple connections with different users and the first tier server 110 receiving (at 130) multiple requests for the same particular content 130 over the multiple connections before the first tier server 110 has retrieved a copy of the particular content.

The first request for the particular content received by the first tier server 110 results in a cache miss as the first tier server 110 does not have a locally stored copy of the particular content to serve in response. Accordingly, the first tier server 110 performs a cache fill to retrieve the particular content from the second tier server 120. To initiate the cache fill, the first tier server 110 requests (at 140) the particular content identified in the first request from the second tier server 120. In some embodiments, the first tier server 110 forwards the initial received request to the second tier server 120. In some other embodiments, the first tier server 110 issues its own request for the particular content to the second tier server 120.

While waiting for the second tier server 120 to satisfy the request passed at 140, the first tier server 110 performs a first multiplexing operation. As part of the first multiplexing operation, the first tier server 110 detects receiving second and subsequent requests that are directed to the same particular content as the first request. Although these requests also result in cache misses, the first tier server 110 does not send additional requests to the second tier server 120. The first tier server 110 modifies its cache miss operation as a result of the pending request for the particular content already sent to the second tier server 120 at step 140. The modified cache miss operation implemented as part of request multiplexing causes the first tier server 110 to queue (at 150) the second and other subsequent requests until a copy of the particular content is retrieved from the second tier server 120.

Once a copy of the particular content is retrieved from the second tier server 120, the first tier 110 server performs a second multiplexing operation. As part of the second multiplexing operation, the first tier server 110 uses the retrieved copy to satisfy the first user request and other queued user requests for the same content. The first tier server locally replicates the particular content and pipes (at 160) the replicated copies over the connections established for each received request.

The request multiplexing embodiment of FIG. 1 improves the first tier server content delivery performance. Subsequent requests arriving after the first request for the same particular content can be satisfied based on the round-trip time needed to fulfill the first request, rather than round-trip times that would commence upon receipt of each of the later received subsequent requests. From the perspective of the users submitting any of the subsequent requests, the round-trip time for the first request is less than the round-trip time for satisfying any of the subsequent requests, because the round-trip time for the first request commences before any of the subsequent requests arrive at the first tier server and before the first tier server can commence the round-trip time for any of the subsequent requests. Moreover, the request multiplexing shields the second tier server from the requests absorbed by the first tier server. Accordingly, the load on the second tier server is reduced, thereby allowing the second tier server to be more responsive to the first request issued by the first tier server than if the second tier server had to respond and send multiple copies of the same content to a single destination.

Figure 2:
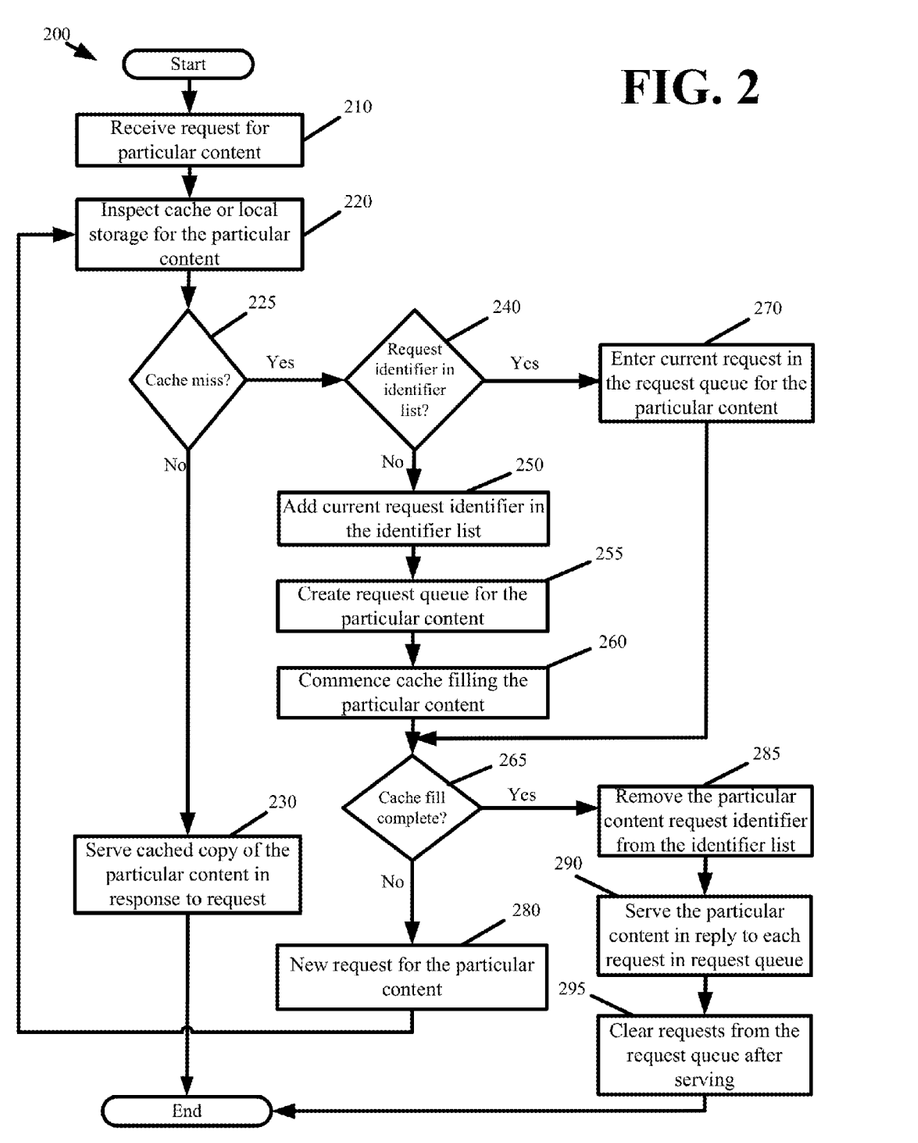
FIG. 2 presents a process for the request multiplexing operation of some embodiments.

FIG. 2 presents a process 200 for the request multiplexing operation of some embodiments. The process 200 is implemented by a first tier server tasked with distributing content of a second tier server.

Process 200 commences upon receiving (at 210) a request for particular content. The process inspects (at 220) the first tier server cache or local storage to determine (at 225) whether the request results in a cache hit or a cache miss.

The request results in a cache hit as a result of a prior cache fill storing a copy of the particular content in cache or local storage of the first tier server. In response to a cache hit, the process (at 230) responds to the request by serving the locally stored copy of the particular content from cache to the requesting user and the process ends.

The request results in a cache miss as a result of the particular content not being stored in the cache or local storage of the first tier server. In response to a cache miss, the process performs request multiplexing.

As part of the request multiplexing, the process determines (at 240) if an identifier of the current received request matches to an identifier from a list of identifiers for pending cache fills. In some embodiments, the list of identifiers is a list of Uniform Resource Locators (URLs), Uniform Resource Identifiers (URIs), file names, or hashed values identifying content in the process of being cached filled from a second tier server based on a prior request for that content.

In response to there being no match between the current request identifier and an identifier from the list of identifiers, the process enters (at 250) the current request identifier in the list of identifiers and creates (at 255) a request queue for the particular content, wherein creating the request queue involves entering the current request in the request queue. In some embodiments, entering the current request in the request queue involves buffering or otherwise retaining a copy of the current request in memory or local storage. In some other embodiments, entering the current request in the request queue involves storing the Internet Protocol (IP) or other identifying information about the requestor in a queue designated for the particular content. The process then commences (at 260) cache filling the particular content by issuing a request for the particular content to the appropriate second tier server. The process then awaits (at 265) the cache fill to complete.

A match between the identifier of the current received request and an identifier from the list of identifiers indicates that the first tier server has received an earlier request for the same particular content, has initiated a request to retrieve the particular content from a second tier server, and is now awaiting for that earlier retrieval to complete. In such cases, the process enters (at 270) the current request in the request queue for the particular content and reverts to step 265 to await the prior cache fill to complete.

In some embodiments, the cache fill completes upon the first tier server receiving a complete copy of the particular content. In some other embodiments (as further described below), the cache fill completes upon receiving any packets from the second tier server that encapsulate part of the particular content.

The process reverts to step 220 should a new request for the particular content arrive (at 280) before the cache fill completes. In response to completing the cache fill, the process removes (at 285) the particular content identifier from the list of identifiers and serves (at 290) the retrieved copy of the particular content in reply to each request within the request queue created for the particular content or particular content identifier. In some embodiments, the process replicates the copy of the particular content so that the particular content can be simultaneously piped to different requestors. The process clears (at 295) each particular request from the particular content request queue once the particular content is served to each particular request and the process ends or restarts upon receiving a new request for the particular content.

Some embodiments enhance and optimize the request multiplexing so that the first tier server can begin responding to queued requests as soon as the first tier server receives parts or segments of the requested content from the second tier server. In other words, the first tier server can respond to the queued user requests before receiving the entirety of the requested content. This greatly improves content delivery performance of the first tier server, especially when large size content is involved.

Figure 3:
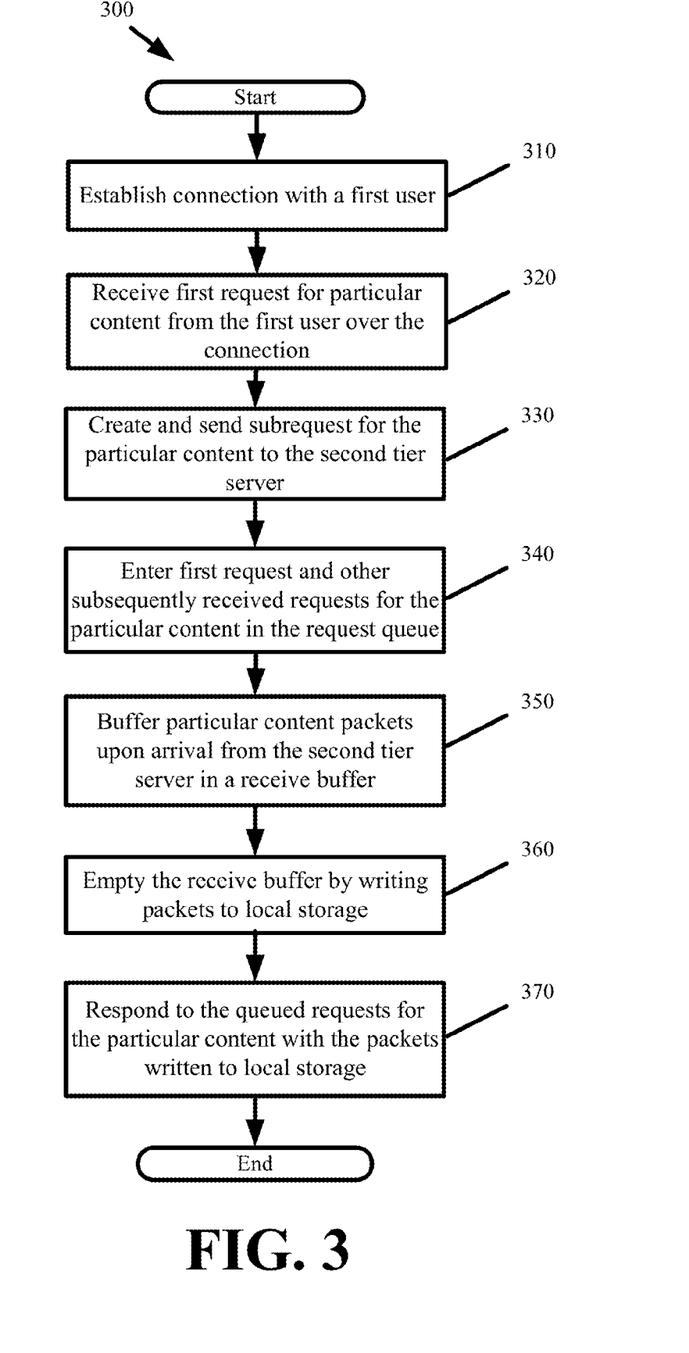
FIG. 3 presents a process for subrequest based request multiplexing in accordance with some embodiments.

The enhancements and optimizations involve creating a subrequest that disassociates user requests from content retrieval. FIG. 3 presents a process 300 for subrequest based request multiplexing in accordance with some embodiments. Process 300 is performed by a first tier server that is tasked with retrieving and distributing content from a second tier server.

Process 300 commences with the first tier server establishing (at 310) a connection with a first user. In some embodiments, the connection establishment occurs according to the Transmission Control Protocol (TCP) handshaking procedure and in response to a connection establishment request submitted by the first user to the first tier server.

The process receives (at 320) a first request for particular content from the first user over the established connection. In this case, the first request will result in a cache miss, because a copy of the particular content is not in the first tier server cache. The first request also does not contain an identifier that matches any identifiers within the list of identifiers for pending cache fills.

Accordingly, the process creates (at 330) and sends a subrequest for the particular content to the second tier server instead of sending or forwarding the first request. The process enters (at 340) the first request and other subsequently received requests for the particular content in the request queue.

The subrequest creation disassociates and removes dependencies between retrieving the content from the second tier server and responding to the first user request or any other user request. In some embodiments, creating the subrequest involves creating a new socket, cloning the first request, establishing a connection from the newly created socket to the second tier server, and submitting the cloned first request through the newly created socket to the second tier server.

In response to the subrequest, the first tier server receives packets encapsulating different parts of the particular content from the second tier server. In particular, the process temporarily buffers (at 350) the packets as they arrive from the second tier server in a receive buffer that is associated with the socket that was created for the connection to the second tier server. The process immediately empties (at 360) the receive buffer by writing the received packets or segments from the receive buffer to local storage or cache.

By creating the subrequest and disassociating the first request from the first requesting user, the first tier server avoids writing the packets or segments from the receive buffer to local storage while forking to simultaneously distribute the packets or segments form the receive buffer to the first requesting user. As demonstrated in FIG. 6 below, this disassociation eliminates any receiving user from slowing the rate at which the receive buffer is emptied.

Simultaneous with steps 350 and 360, the process begins responding (at 370) to the queued requests for the particular content with the packets or segments written to local storage or cache. As each user connection with the first tier server remains independent of other user connections and independent of the connection the first tier server has established with the second tier server, the rate at which different users receive the particular content from the first tier server does not affect the rate at which other users receive the particular content from the first tier server or the rate at which the first tier server retrieves the particular content from the second tier server.

Accordingly, the first tier server performing process 300 distributes different first parts of the particular content to the queued requests based on the rates at which individual users can receive the particular content. Simultaneously, the first tier server writes a second part of the particular content from the receive buffer to the local storage while receiving a later third part of the particular in the receive buffer.

Figure 4:
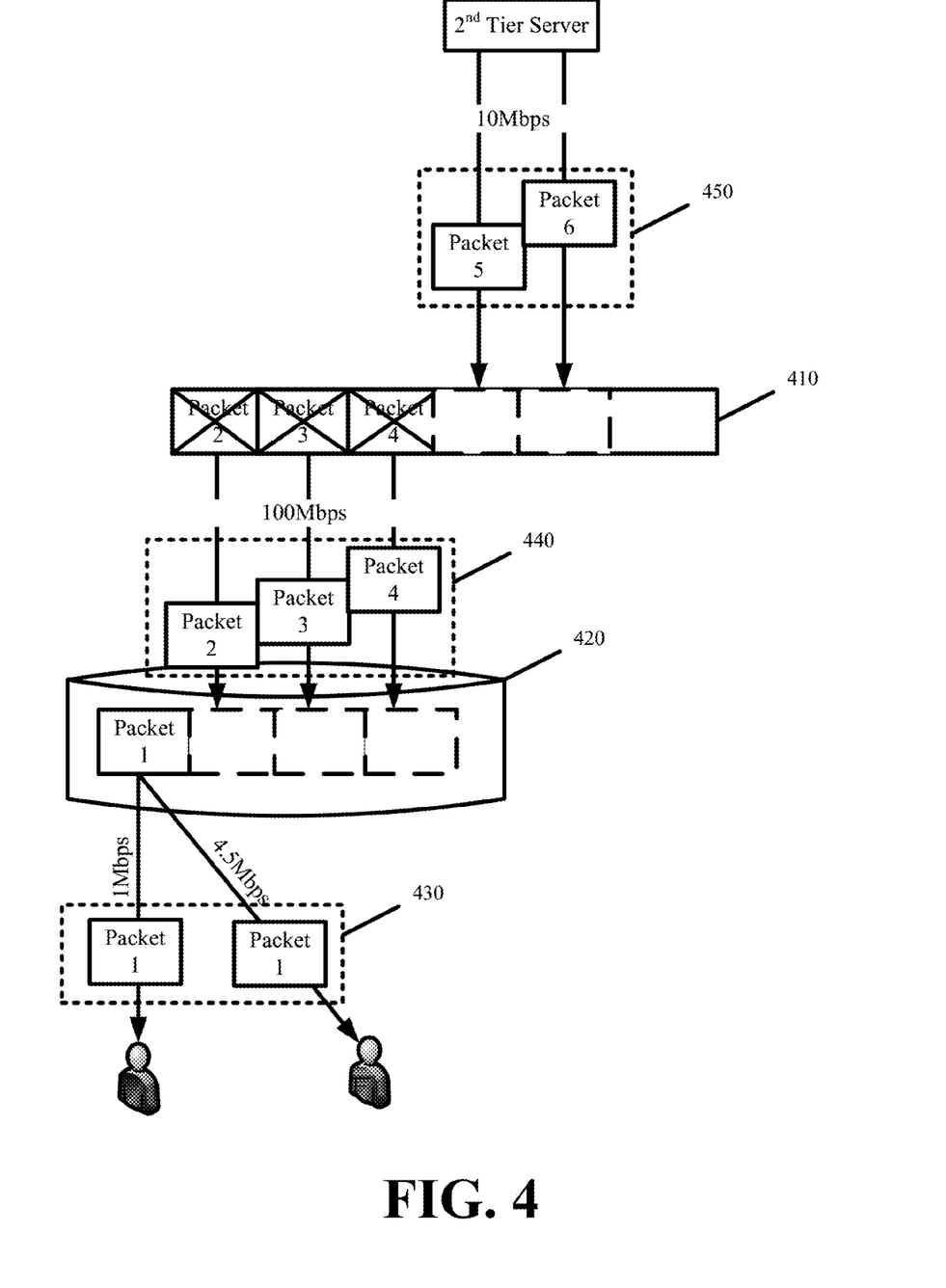
FIG. 4 illustrates the simultaneous distribution, writing, and receiving of content in performing request multiplexing in accordance with some embodiments.

FIG. 4 illustrates the simultaneous distribution, writing, and receiving of content in performing request multiplexing in accordance with some embodiments. The figure illustrates a first tier server receive buffer 410 and local storage 420. The figure further illustrates the first tier server sending a first set of packets 430 of particular content that have been written to the local storage 420 to different end users, while writing a second set of packets 440 from the receive buffer 410 to local storage 420, while also receiving a third set of packets 450 from a second tier server. The first tier server performs each of the distribution, writing, and receiving at different rates depending on available resources at either end of each operation.

Figure 5:
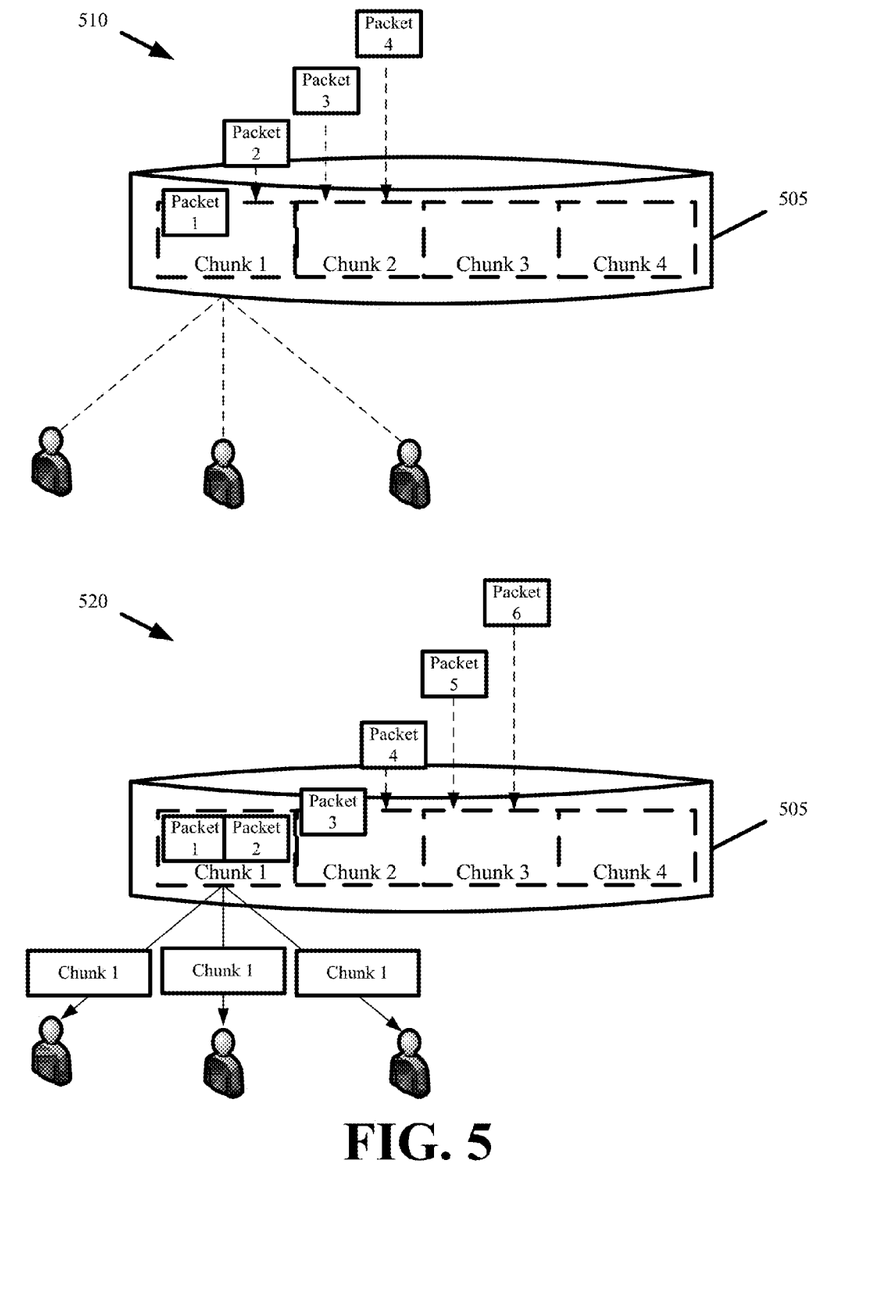
FIG. 5 provides further illustration for the simultaneous retrieving and distribution of content performed in accordance with the request multiplexing of some embodiments.

FIG. 5 provides further illustration for the simultaneous retrieving and distribution of content performed in accordance with the request multiplexing of some embodiments. This figure illustrates local cache of a first tier server 505 at two different stages 510 and 520.

At the first stage 510, the first tier server writes a first chunk of particular content to the local cache 505. A chunk can be formed based on content data from one or more packets. In some embodiments, the chunk size is configurable. For instance, the first tier server can write the particular content retrieved from the second tier server in 64, 128, or 256 kilobyte chunks. The first tier server receives the particular content from a second tier server in response to a subrequest for the particular content sent from the first tier server to the second tier server. As illustrated in FIG. 4, the writing of the first chunk can involve emptying packets from a receive buffer of the first tier server. While the first tier server writes the first chunk to the local cache 505, the first tier server is unable to serve the first chunk to any of a set of queued requests for the particular content.

At the second stage 520, the first tier server has completed writing the first chunk to the local cache 505 and begins writing a second chunk of the particular content to the local cache 505, wherein the second tier server continues passing the second chunk and other subsequent chunks of the particular content in response to the original subrequest until all chunks forming the particular content are passed to the first tier server. While writing the second chunk, the first tier server serves the cached copy of the first chunk from the local cache 505 in response to each request in the set of queued requests. The first tier server continues serving written chunks from the local cache 505 while writing subsequent chunks to the local cache 505 until all chunks have been cached and served in response to all requests in the request queue or until there is a disk or network error.

Figure 6:
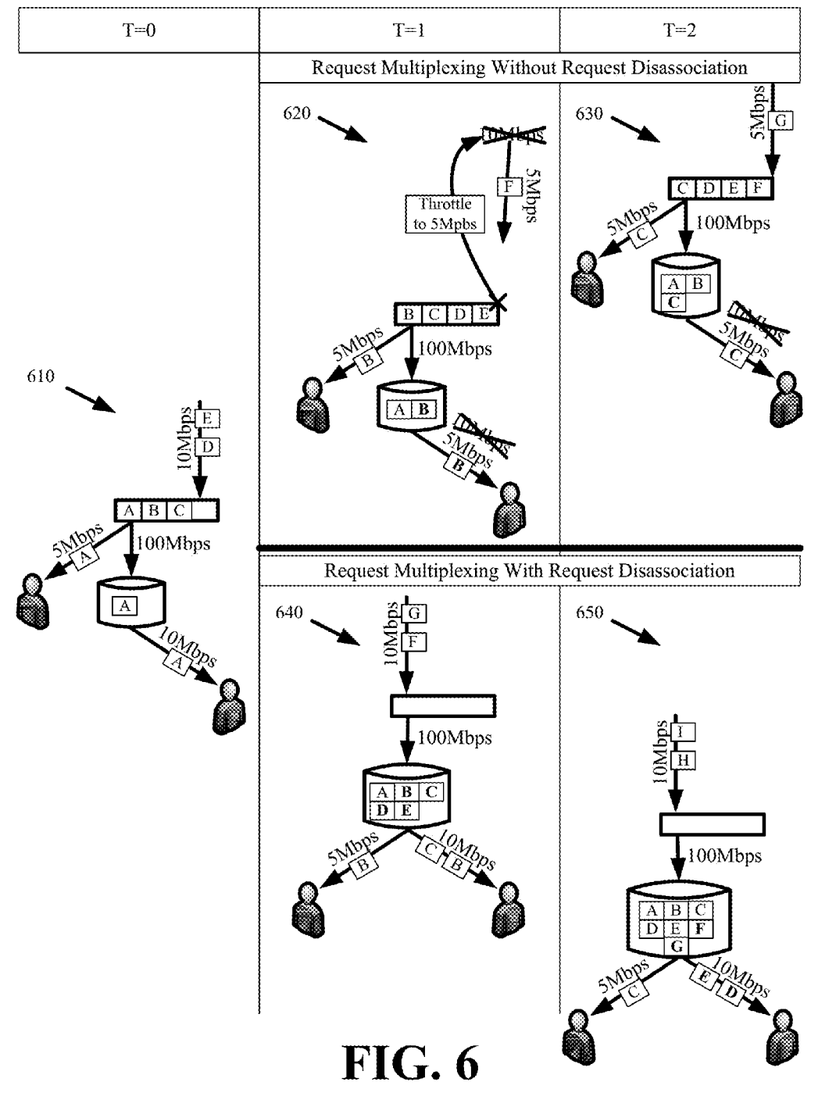
FIG. 6 conceptually illustrates the accelerated retrieval and redistribution of content from an origin source as a result of request multiplexing subrequest creation in accordance with some embodiments.

FIG. 6 conceptually illustrates the accelerated retrieval and redistribution of content from an origin source as a result of request multiplexing subrequest creation in accordance with some embodiments. The figure illustrates an initial state of the first tier server cache, receive buffer, distribution, writing, and receiving at 610. The figure then illustrates a first scenario at 620 and 630 for how the first tier server cache, receive buffer, distribution, writing, and receiving are impacted at two later points in time as a result of request multiplexing without subrequest creation, and a second scenario at 640 and 650 for how the first tier server cache, receive buffer, distribution, writing, and receiving are impacted at the same two later points in time as a result of request multiplexing with subrequest creation. In the first scenario at 620 and 630, the first tier server does not use the subrequest to disassociate the first requesting user from the retrieval of content from the origin source, whereas in the second scenario at 640 and 650, the first tier server uses the subrequest to disassociate the first requesting user from the retrieval of content from the origin source and the cache fill operation.

In the first scenario illustrated by 620 and 630, the first tier server empties the receive buffer by writing the packets or segments to local storage while simultaneously sending the packets or segments to the first requesting user whose request initiated the cache fill operation from the second tier server. The first requesting user receives the packets at a much slower rate than the first tier server receives subsequent packets of the same content from the second tier server. As a result, the first tier server is unable to empty the receive buffer faster than the second tier server can fill the receive buffer. This causes the first tier server to throttle (see 620) the rate at which the second server sends the packets or segments and fills the first tier server receive buffer. This throttling has a trickledown effect ultimately slowing the rate at which the first tier server retrieves the particular content from the second tier server. The throttling also effects how fast the first tier server can begin responding to all other user requests as all other users are now dependent on the rate at which the first requesting user empties the first tier server receive buffer to allow for the retrieval of subsequent packets or segments from the second tier server.

In the second scenario illustrated by 640 and 650, the first tier server creates a subrequest to disassociate content retrieval from responding to user requests. As noted above, the subrequest creation involves the first tier server cloning the first request from the first requesting user, issuing the cloned request over a new connection and socket established with the second tier server, and inserting the first requesting user or first requesting user request in the queue with other requestors for the particular content. In so doing, the first tier server, rather than the first requesting user, becomes the designated endpoint for receipt of the particular content. Consequently, the first tier server does not distribute packets or segments in the receive buffer directly to any user. The first tier server is therefore able to empty the receive buffer based on the rate at which the first tier server writes the packets or segments in the receive buffer to local storage. The locally stored packets or segments are then sent to the queued users at the maximum rate supported by each user. As shown in 650, the request multiplexing with subrequest creation allows a later arriving second user to receive content faster from the first tier server than a first arriving first user even though the request from the first user initiated the first tier server cache fill operation.

Some embodiments further optimize and enhance request multiplexing for redundancy and failover. In some such embodiments, the first tier server associates a timer with each request placed in the request queue.

The timer defines an acceptable waiting time for a request to remain in queue while waiting for requested content to arrive in response to cache filling commenced as a result of a prior issued request for the same content. The timer prevents queued requests from waiting indefinitely if a previously initiated cache fill or subrequest is unsuccessful.

If a timer for a queued request expires, the first tier server may issue a new request for the requested content to the second tier server or provide an error to the requesting user. If packets or segments for requested content are received prior to expiration of a timer associated with a subsequent request, the timer may be cancelled.

Timers are set according to request arrival times and a configurable waiting time. The configurable waiting time can differ for different users. The different configurable waiting times can be used to establish different quality of service or to account for latency associated with paths to different requesting users. The configurable waiting times can be content provider or requesting user specific, wherein any feature of the user request can be used to set different timers. For example, the first tier server can set different timers for a first request sent from a first user device identified by a first user agent and a second request sent from a second user device identified by a different second user agent.

Timers can also be used to accelerate requests for specific byte ranges. The HyperText Transfer Protocol (HTTP) supports byte range requests, whereby a user requests some portion of content rather than the entirety of the content. Byte range requests are commonly used for requesting different segments of streaming content. A first request may arrive requesting the entirety of a five minute video from beginning to end. In response to the first request, the first tier server creates a subrequest to the second tier server in order to retrieve all five minutes of the video. A second request may arrive shortly after the first request with the second request requesting only the last minute of the five minute video. Since the second request is directed to the same video, the first tier server may queue the second request while waiting for the first subrequest generated in response to the first request to complete. The first tier server can however set the timer for the second timer to expire so that the second request is not left waiting for the first four minutes of the video to arrive. Upon expiration of the second request timer, the first tier server can issue the byte range request to retrieve the last minute of the five minute video for the second request while contemporaneously retrieving all five minutes of the video for the first request.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
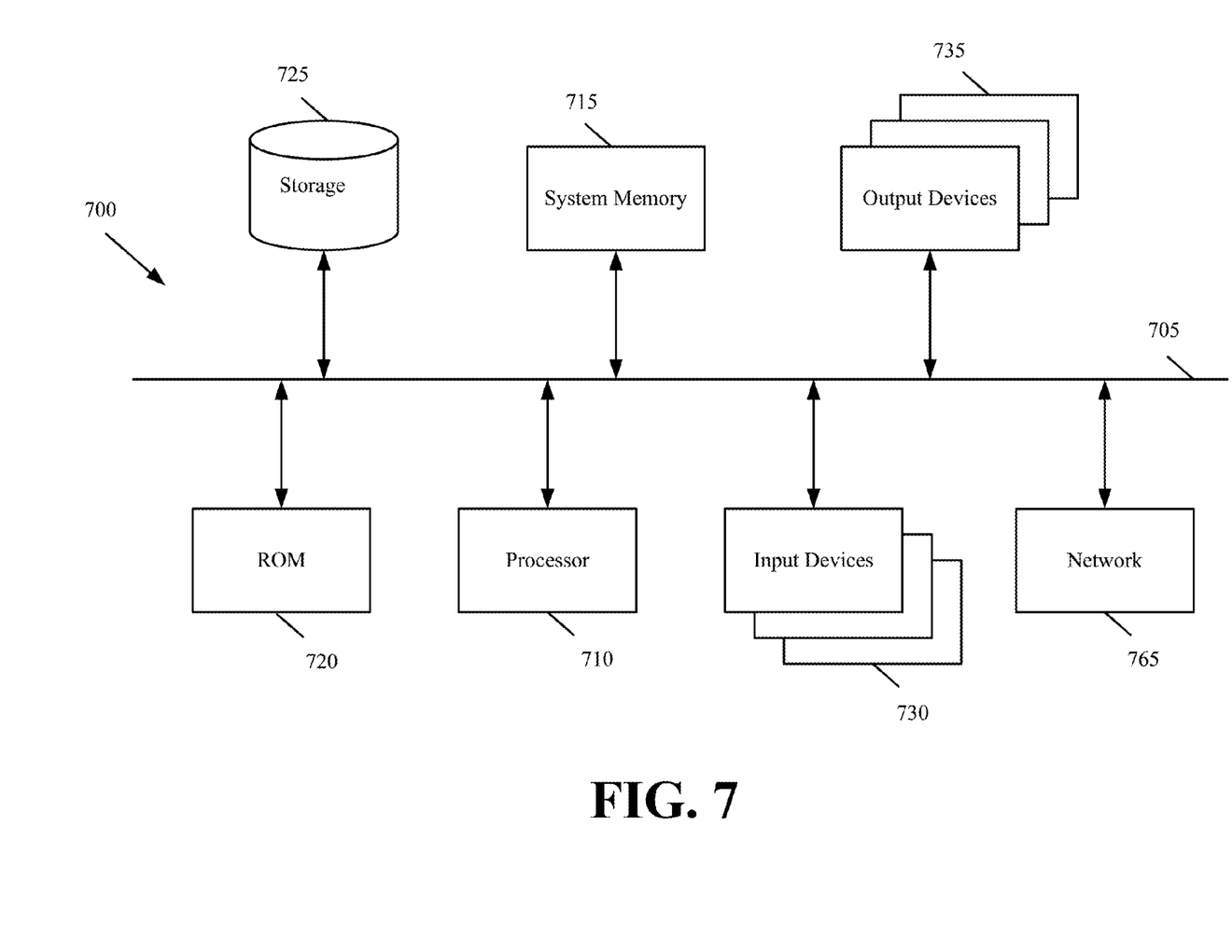
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., first tier server, second tier server, or origin server). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments use a mass-storage device (such as a magnetic, solid-state, or optical disk) as the permanent storage device 725.

Other embodiments use a removable storage device (such as a flash drive) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving a first request for particular content at a first-tier server;
requesting the particular content from a second-tier server in response to the first request, and further in response to the particular content not being stored at the first-tier server;
entering the first request in a request queue for the particular content;
receiving a second request for the particular content at the first-tier server after said requesting and before receipt of the particular content from the second-tier server;
entering the second request in the request queue without issuing another request for the particular content to the second-tier server in response to entry of the first request in the request queue;
receiving a first set of packets forming a first part of the particular content at the first-tier server from the second-tier server;
distributing the first set of packets from the first-tier server in response to both the first request and the second request, said distributing occurring at a first rate that is slower than a second rate at which the first-tier server receives and writes a second set of packets forming a second part of the particular content to local storage of the first-tier server.

2. The method of claim 1 further comprising scheduling a timer upon entering the second request in the request queue.

3. The method of claim 2 further comprising issuing another request for the particular content from the first-tier server based on the timer expiring before the second-tier server sends at least one packet of the particular content to the first-tier server in response to said requesting.

4. The method of claim 2 further comprising canceling said timer in response to receiving at least one packet of the particular content from the second-tier server before expiration of said timer.

5. The method of claim 1, wherein said distributing comprises sending a first packet of the particular content in response to the first request at a same time as sending the first packet in response to the second request even though the second request arrives later than the first request at the first-tier server.

6. The method of claim 1, wherein requesting the particular content comprises cloning the first request, issuing a first request clone to the second-tier server, and inserting the first request in the request queue.

7. The method of claim 1 further comprising:
populating a receive buffer of the first-tier server with a plurality of packets forming part of said particular content as the plurality of packets arrive from the second-tier server in response said requesting;
emptying the receive buffer by writing the plurality of packets to local storage of the first-tier server as the plurality of packets populate the receive buffer; and
wherein said distributing comprises responding to the first request and the second request with the plurality of packets from the local storage after the plurality of packets are written to the local storage.

8. The method of claim 7, wherein emptying the receive buffer comprises writing the plurality of packets at a rate equal to or faster than said populating, and wherein said distributing comprises issuing the plurality of packets from the first-tier server at a rate less than said populating.

9. The method of claim 7, wherein said receiving the second request comprises receiving the second request some time after receiving the first request, and wherein said distributing comprises sending the particular content at the same time in response to each of the first and second requests, wherein no delay is associated with responding to the second request relative to the first request even though the second request arrives later than the first request.

10. The method of claim 1 further comprising cloning the first request.

11. The method of claim 10, wherein said requesting comprises creating a new socket, establishing a connection with the new socket as one endpoint and the second-tier server as the other endpoint, and issuing the cloned first request over said connection.

12. A method comprising:
receiving a first request for particular content at a first-tier server;
requesting the particular content from a second-tier server in response to the first request, and further in response to the particular content not being stored at the first-tier server;
entering the first request in a request queue for the particular content;
receiving a second request for the particular content at the first-tier server after said requesting and before receipt of the particular content from the second-tier server;
entering the second request in the request queue without issuing another request for the particular content to the second-tier server in response to entry of the first request in the request queue;
scheduling a timer upon entering the second request in the request queue;
issuing another request for the particular content from the first-tier server based on the timer expiring before the second-tier server sends at least one packet of the particular content to the first-tier server in response to said requesting;
distributing the particular content simultaneously from the first-tier server in response to both the first request and the second request upon receiving the particular content from the second-tier server.

13. The method of claim 12, wherein said distributing comprises sending a first set of packets, forming a first part of the particular content from the first-tier server in response to the first request and the second request, at a first rate that is slower than a second rate at which the first-tier server receives and writes a second set of packets forming a second part of the particular content to local storage of the first-tier server.

14. The method of claim 12, wherein said distributing comprises sending a first packet of the particular content in response to the first request at a same time as sending the first packet in response to the second request even though the second request arrives later than the first request at the first-tier server.

15. The method of claim 12 further comprising:
writing a first set of packets forming a first part of the particular content to local storage of the first-tier server as the first set of packets arrive at the first-tier server from the second-tier server in response said requesting; and
wherein said distributing comprises providing the first set of packets from the local storage simultaneously in response to the first and second requests while writing a subsequent second set of packets forming a second part of the particular content to said local storage.

16. The method of claim 12 further comprising canceling said timer in response to receiving at least one packet of the particular content from the second-tier server before expiration of said timer.

17. The method of claim 12, wherein requesting the particular content comprises cloning the first request, issuing a first request clone to the second-tier server, and inserting the first request in the request queue.

18. The method of claim 12, wherein said requesting comprises creating a new socket, establishing a connection with the new socket as one endpoint and the second-tier server as the other endpoint, and issuing the first request over said connection.

19. A method comprising:
receiving a first request for particular content at a first-tier server;
requesting the particular content from a second-tier server in response to the first request, and further in response to the particular content not being stored at the first-tier server;
entering the first request in a request queue for the particular content;
receiving a second request for the particular content at the first-tier server after said requesting and before receipt of the particular content from the second-tier server;
entering the second request in the request queue without issuing another request for the particular content to the second-tier server in response to entry of the first request in the request queue;
populating a receive buffer of the first-tier server with a plurality of packets forming part of said particular content as the plurality of packets arrive from the second-tier server in response said requesting;
emptying the receive buffer by writing the plurality of packets to local storage of first-tier server as the plurality of packets populate the receive buffer, wherein emptying the receive buffer comprises writing the plurality of packets at a rate equal to or faster than said populating; and
distributing the plurality of packets from the local storage after the plurality of packets are written to the local storage in response to both the first request and the second request, wherein said distributing comprises issuing the plurality of packets from the first-tier server at a rate less than said populating.

20. The method of claim 19 further comprising:
scheduling a timer upon entering the second request in the request queue; and
issuing another request for the particular content from the first-tier server based on the timer expiring before the second-tier server sends at least one packet of the particular content to the first-tier server in response to said requesting.

* * * * *